US008473423B2

(12) United States Patent
Krishnakumar et al.

(10) Patent No.: US 8,473,423 B2
(45) Date of Patent: Jun. 25, 2013

(54) CONTACT CENTER EXPERT IDENTIFICATION

(75) Inventors: Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 276 days.

(21) Appl. No.: 12/797,507

(22) Filed: Jun. 9, 2010

(65) Prior Publication Data

US 2011/0307402 A1  Dec. 15, 2011

(51) Int. Cl.
*G06Q 10/00* (2012.01)
*H04M 3/00* (2006.01)

(52) U.S. Cl.
USPC .................. 705/321; 705/1.1; 379/266.01

(58) Field of Classification Search
USPC ............. 705/1.1, 11, 321; 379/266.01, 266.1
See application file for complete search history.

(56) References Cited

U.S. PATENT DOCUMENTS

| | | | | |
|---|---|---|---|---|
| 6,671,368 | B1 * | 12/2003 | Contino et al. | 379/265.09 |
| 6,718,022 | B1 * | 4/2004 | Ehrlich et al. | 379/133 |
| 7,050,569 | B1 * | 5/2006 | Weaver et al. | 379/266.01 |
| 7,127,058 | B2 * | 10/2006 | O'Connor et al. | 379/265.01 |
| 7,623,651 | B2 * | 11/2009 | Ju et al. | 379/265.01 |
| 7,724,890 | B1 * | 5/2010 | Conrad et al. | 379/266.1 |
| 2004/0138903 | A1 * | 7/2004 | Zuniga | 705/1 |
| 2004/0174980 | A1 * | 9/2004 | Knott et al. | 379/266.01 |
| 2004/0186743 | A1 * | 9/2004 | Cordero, Jr. | 705/1 |
| 2007/0088601 | A1 * | 4/2007 | Money et al. | 705/10 |
| 2007/0230683 | A1 | 10/2007 | Brown et al. | |
| 2008/0144804 | A1 * | 6/2008 | Mergen | 379/266.1 |
| 2010/0042574 | A1 * | 2/2010 | Dewar | 706/54 |

FOREIGN PATENT DOCUMENTS

EP          1091548          4/2001

* cited by examiner

*Primary Examiner* — Candice D Wilson
*Assistant Examiner* — Johnathan Lindsey, III
(74) *Attorney, Agent, or Firm* — Sheridan Ross P.C.

(57) ABSTRACT

A system evaluates callers, into a contact center, for possible employment. The evaluations occur while the caller waits in a contact center queue and provide a rating of the callers as potential employees. Ratings may be generated or accumulated from one or more interactions with the contact center, where each interaction with the caller can provide information about the caller's suitability as an employee. Good candidates may be interviewed automatically and/or by a manager. Those candidates that receive good ratings/evaluations and are interested in the position may be hired or provided incentives to help the call center respond to calls.

20 Claims, 8 Drawing Sheets

CONTACT CENTER EXPERT IDENTIFICATION

BACKGROUND

Calling a call center for support can sometimes try a person's patience. Often times, callers must wait on hold for long periods of time before having their calls addressed. During these wait times, the caller generally has nothing productive to do but wait. Thus, the caller can get bored and aggravated by the wait and lack of attention.

Another problem exists, with call centers, which contributes to the longer wait times—a lack of qualified people to answer the calls. Using traditional methods, the contact center manager may have to go through hundreds of resumes to identify potential candidates for interviewing and hiring. This traditional hiring process can be time-consuming and often yield modest results. Further, the need for additional help may only be needed during high call volumes, which may be only temporary. With more qualified people, even if working temporarily, the call center may be able to address callers' issues more efficiently and quickly but finding qualified people is difficult.

SUMMARY

It is with respect to the above issues and other problems that the embodiments presented herein were contemplated. A system is provided to evaluate callers for possible employment. The evaluations provide a rating of the callers as potential employees. Ratings may be generated or accumulated from one or more interactions with the call center, where each interaction with the caller can provide information about the caller's suitability as an employee. Good candidates may be interviewed automatically and/or by a manager. Those candidates that receive good ratings/evaluations and are interested in the position may be hired or provided incentives to help the call center respond to calls.

The proposed idea is to determine if a caller who is calling in about a specific subject may be a potential candidate for a position in a contact center. When a person calls into a contact center, he/she may be asked potential questions in order to route the call to a specific agent who has the concomitant expertise to answer the caller's question. Based on this initial query of the caller, the caller may be identified as a potential candidate because he/she has been identified to have some skill or knowledge about areas with which the contact center needs help. The caller may then be asked if he/she wants to take a survey about their expertise in specific areas and to determine if there is interest by the caller to be employed. The caller could be directed to an interactive website (based on the caller's approval) to take the survey. If there is a potential match, the agent could be notified prior to answering the call to further inquire of the caller for more detail about the caller's expertise in key areas and if the caller is interested in pursuing the position.

Based on the agent's input to the survey and/or the initial questions answered, an event to notify a manager to talk to the caller may be generated. The response information can be used to contact the caller at a later date. After the determination that the caller is a potential candidate, the system could further query the caller for their resume and other things through a link to an interactive web site that is identified in an email sent to the caller. A social network connection may also be generated to address the probability of interviewing the candidate formally.

Another option may be to identify the caller as a candidate to answer other caller's questions at a later time when the caller is waiting in the call wait queue. The caller could be given a code or identified by their telephone number or some other identifier. The code can be used by the caller so the system will know in what areas that he/she is considered an expert and can potentially answer questions of other callers. The caller can get rewarded for answering questions of other callers.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

While exemplary embodiments are described, it should be appreciated that individual aspects can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
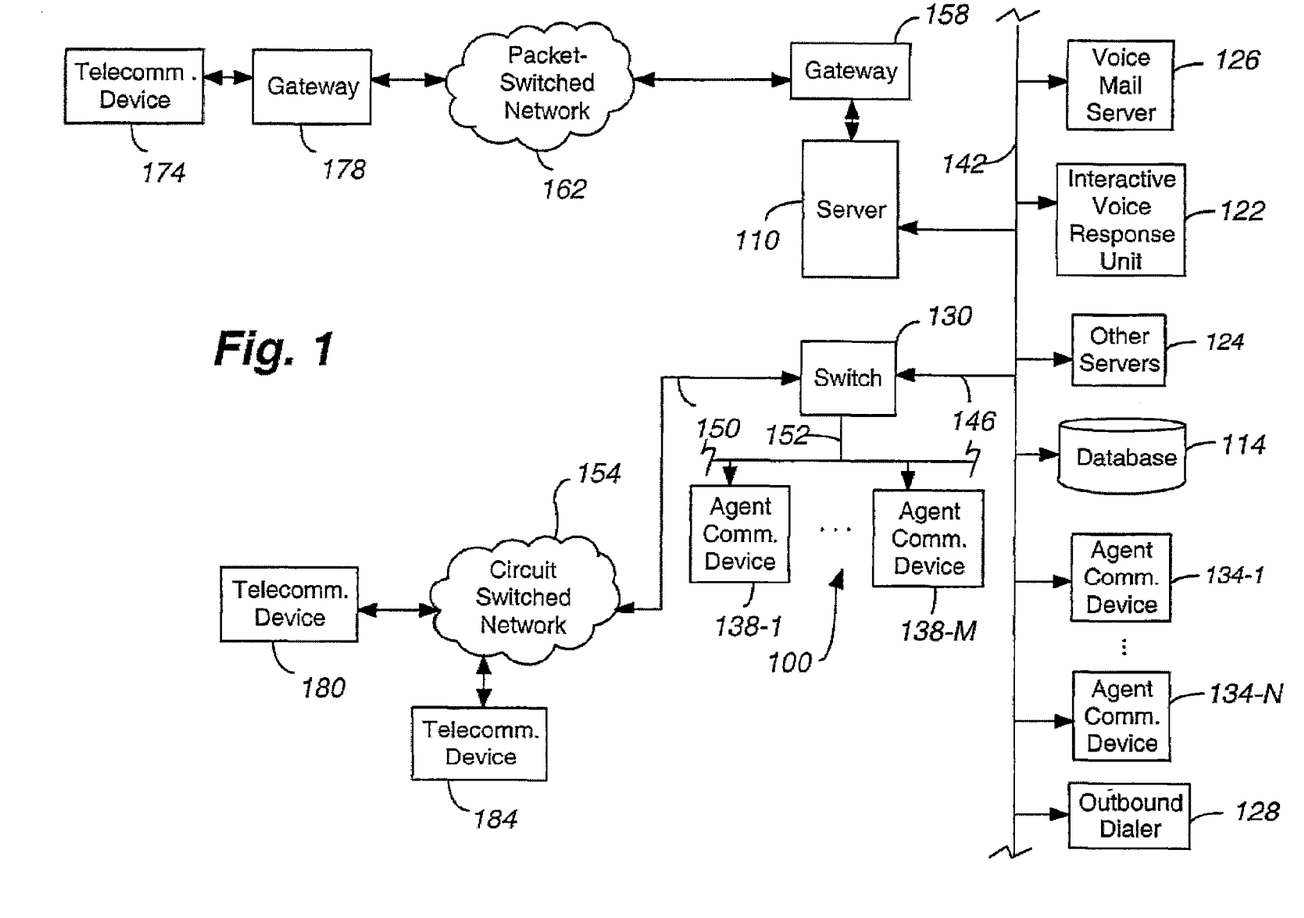
FIG. 1 is a block diagram of an embodiment of a contact center.

FIG. 1 shows an illustrative embodiment of a contact center 100. A contact center 100 comprises a central server 110, a set of data stores or databases 114 containing contact or customer related information and other information that can enhance the value and efficiency of the contact, and a plurality of servers, namely a voice mail server 126, an Interactive Voice Response unit or IVR 122, and other servers 124, an outbound dialer 128, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

Figure 2:
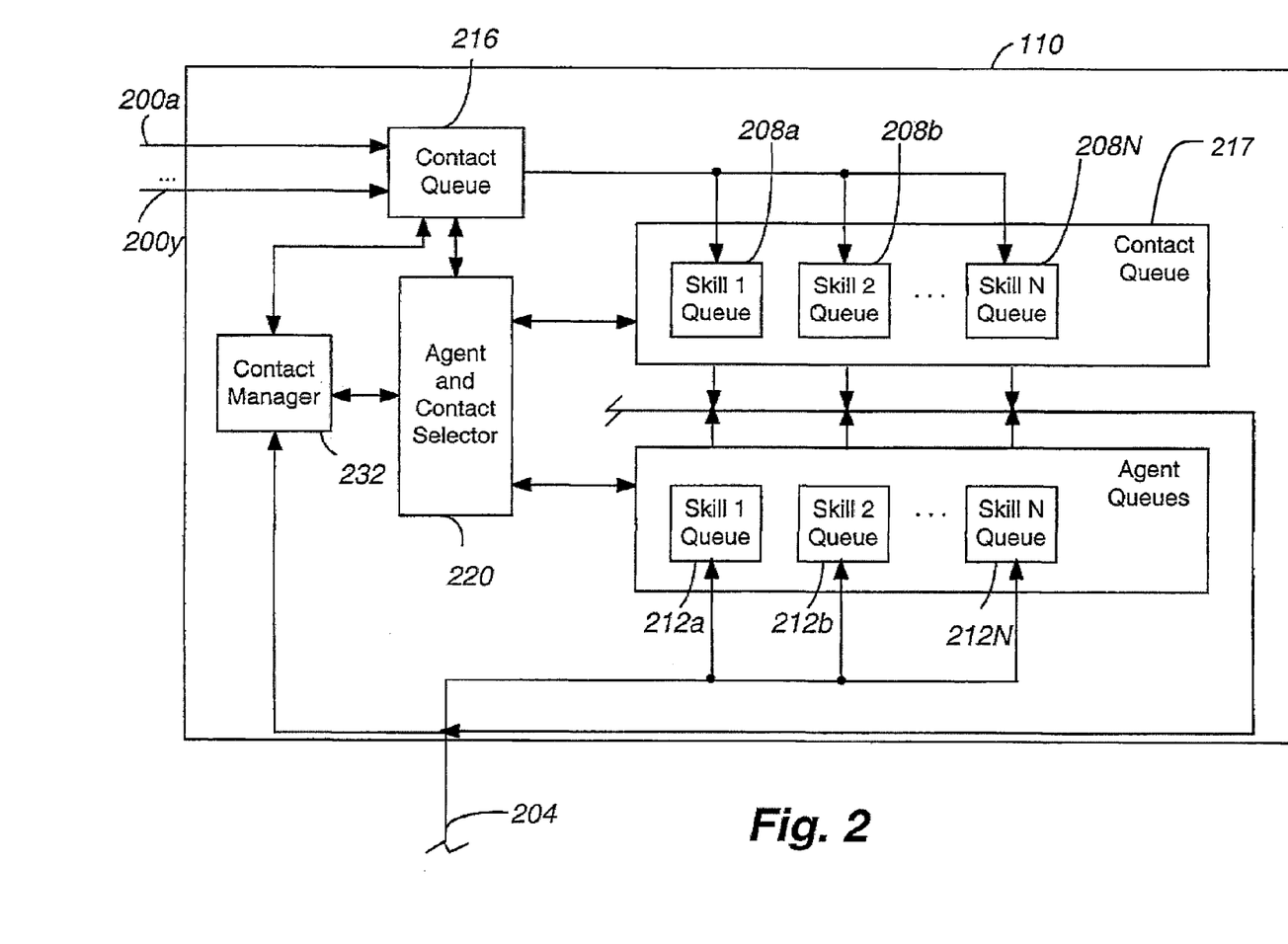
FIG. 2 is a block diagram of an embodiment of a contact center server.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 146). The server 110 can include a Basic Call Management System or BCMS (not shown) and a Call Management System or CMS (not shown) that gathers call records and contact-center statistics for use in generating contact-center reports.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference in their entirety for all that they teach; Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center-Express™, Contact Center Manager Server™, Contact Center Portfolio™, and Messaging 100/150 Basic Contact Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are queued in individual ones of the contact queues 208a-n in their respective orders of priority or are queued in different ones of a plurality of contact queues that correspond to a different priority. Likewise, each agent's skills are prioritized according to his or her level of expertise in that skill, and either agents are queued in individual ones of agent queues 212a-n in their order of expertise level or are queued in different ones of a plurality of agent queues 212a-n that correspond to a skill and each one of which corresponds to a different expertise level.

Included among the control programs in the server 110 is a contact selector 220. Contacts incoming to the contact center, which are temporarily held in contact queue 216, are assigned by contact selector 220 to different contact queues 208a-n based upon a number of predetermined criteria, including customer identity, customer needs, contact center needs, current contact center queue lengths, customer value, and the agent skill that is required for the proper handling of the contact. The queues 208a-n are part of a larger contact queue

217. The predetermined criteria may be obtained by either automatic or initial human interaction to determine the needs of the customer. These criteria can be used to initially evaluate the customer as a potential employee as described in conjunction with FIGS. 3 through 6.

Agents who are available for handling contacts are assigned to agent queues 212$a$-$n$ based upon the skills that they possess. An agent may have multiple skills, and hence may be assigned to multiple agent queues 212$a$-$n$ simultaneously. Furthermore, an agent may have different levels of skill expertise (e.g., skill levels 1-N in one configuration or merely primary skills and secondary skills in another configuration), and hence may be assigned to different agent queues 212$a$-$n$ at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G250™, G350™, G430™, G450™, G650™, G700™, and IG550™ Media Gateways and may be implemented as hardware such as via an adjunct processor (as shown) or as a chip in the server. The first telecommunication devices 134-1, . . . 134-N are packet-switched and can include, for example, IP hardphones such as the Avaya Inc.'s, 1600™, 4600™, and 5600™ Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, S400™, and 9600™ Series phones.

It should be noted that the embodiments do not require any particular type of information transport medium between switch or server and first and second telecommunication devices, i.e., the embodiments may be implemented with any desired type of transport medium as well as combinations of different types of transport media. The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In some configurations, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be emphasized that the configuration of the switch, server, user telecommunication devices, and other elements as shown in FIG. 1 is for purposes of illustration only and should not be construed as limiting the embodiments to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, the instant messaging server, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is suited for a Customer Relationship Management (CRM) environment in which customers are permitted to use any media to contact a business. In a CRM environment, both real-time and non-real-time contacts must be handled and distributed with equal efficiency and effectiveness.

In embodiments, included among the programs executing on the server 110 are an agent and contact selector 220 and contact manager 232. The selector 220 and manager 232 are stored either in the main memory or in a peripheral memory (e.g., disk, CD ROM, etc.) or some other computer-readable medium of the center 100. The selector and manager collectively effect an assignment between available contacts in a queue and available agents serving the queue in a way that tends to maximize contact center efficiency. The selector 220 uses predefined criteria in selecting an appropriate agent to service the contact. The manager 232 assigns services priorities to contacts and, as part of this function, identifies contacts as disconnected or transitory contacts and determines whether such contacts merit special treatment. The manager 232 provides instructions to the selector 220 to effect the special treatment.

The contact manager 232, based on one or more selected criteria, determines whether a contact should be reviewed for hiring potential. Special treatment includes providing the contact with materials or surveys to evaluate the person's potential as an employee or contractor, scheduling a call-back on the same channel for interviewing by a hiring agent or manager, etc. These and other embodiments are described in conjunction with FIG. 3.

Figure 3:
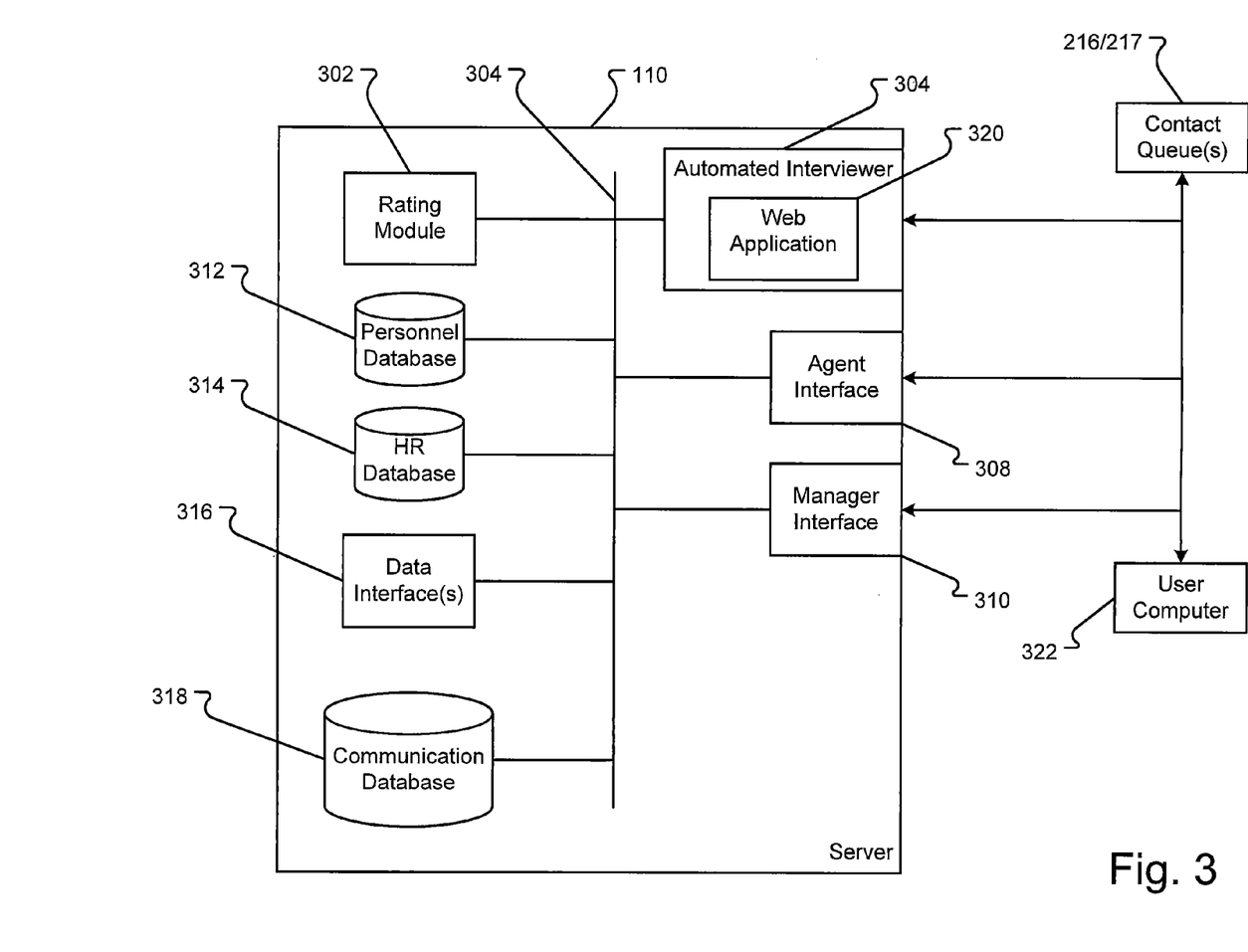
FIG. 3 is another block diagram of an embodiment of a contact center server including a caller evaluation system.

An embodiment of the central server 110 (referred to as "server") in the contact center 100, which includes a system for evaluating callers for employment potential, is shown in FIG. 3. Generally, the caller evaluation system of the central server 110, which may be a computer system as described in conjunction with FIGS. 7 and 8, includes one or more software modules, components, etc. that are operable to evaluate callers. However, in embodiments, the modules, components, etc. described in conjunction with FIG. 3 are embodied in specially designed hardware, such as a application specific integrated circuit (ASIC) or field programmable gate array (FPGA). However, the central server 110 is described as a computer system executing software to provide the functionality, but the embodiments are not limited to these examples as one skilled in the art will understand.

The server 110 can be in communication with the contact queue(s) 216/217 and a user computer 322. The user computer 322 can be the computing system associated with the caller who is currently waiting in the contact queue(s) 216/217. Thus, the server 110 is able to communicate with the caller both by voice, while the caller waits in the contact queue(s) 216/217, and through their user computer 322 allowing for the server to communicate in different communication media.

A rating module 302 is operable to compose and create a rating for the caller in the contact queue. The rating module 302 may receive information from the automated interviewer 304, the agent interface 308, and the manager interface 310 that allows the rating module 302 to rate the caller. The rating information can be one or more responses to automated questions or one or more evaluations from either the contact center agent or a manager. The algorithm used to rate the caller may be specified by a user and stored in the human resources (HR) database 314. The algorithm can have a pre-determined scoring system, weighting system, and/or method for determining the rating. Thus, each particular position for which the caller is being evaluated can have a different algorithm that focuses on the needs of that position.

The automated interviewer 304 is an application that can automatically present questions to a caller, either in the contact queue via an IVR module or over a web application 320 to the user's computer 322. The questions presented can be stored in the HR database 314 and presented to the automated interviewer 304. As such, the questions may be contained in XML or other data structure and translated by the automated interviewer 304 for presentation to the caller. The responses may be received and stored in a caller profile stored in the personnel database 312. The caller profile may be as described in conjunction with FIG. 4.

The web application 320 provides pages of questions to the user computer 322 and receives caller responses that are to be stored in the caller profile. Thus, the caller can be evaluated automatically by the automated interview 304, while the caller waits in the contact queue(s) 216/217. The questions may evaluate the proficiency or expertise of the caller for one or more positions which need to be filled. The information stored in the customer profile may then be used by the rating module to rate the individual.

An agent interface 308 may be the same or similar to the agent communication device 138 or 134, which allows the agent to communicate with the caller in the contact queue(s) 216/217. The agent interface 308 allows the agent to communicate and determine their assessment of the person's suitability for employment. The agent may be given one or more items of information from the HR database 314 to ask the caller in the contact queue(s) 216/217. For example, the agent interface may read a document or other communication stating that the agent should evaluate the person in the contact queue(s) 216/217. Further, the HR database 314 may provide to the agent interface 308, a list of questions to ask. The agent's assessment of the person 308 may be stored in the customer profile in the personnel database 312. Again, the agent's assessment may be used by the rating module 302 to rate the individual holding in the contact queue(s) 216/217. It should be noted that more than one agent may communicate with the caller. For example, the subject matter expert that will answer the caller's questions may rate the call, and another hiring agent (i.e., a person specially trained to interview and evaluate employment candidates) may also interview and assess the candidate.

The manager interface 310 can be similar to the agent interface 308 and be another communication device such as communication device 138 and/or 134. The manager interface 310 allows a person, other than an agent, to contact and communicate with the caller in the contact queue(s) 216/217 or on the caller's user computer 322. The manager interface 310 may, similar to the agent interface 308, extract information from the HR database 314 and store information in the customer profile in the personnel database 312. The manager's assessment may also be provided to the rating module 302 to rate the individual. Further, the manager may make the final determination of whether to hire the caller and store that information in the personnel database 312.

Figure 7:
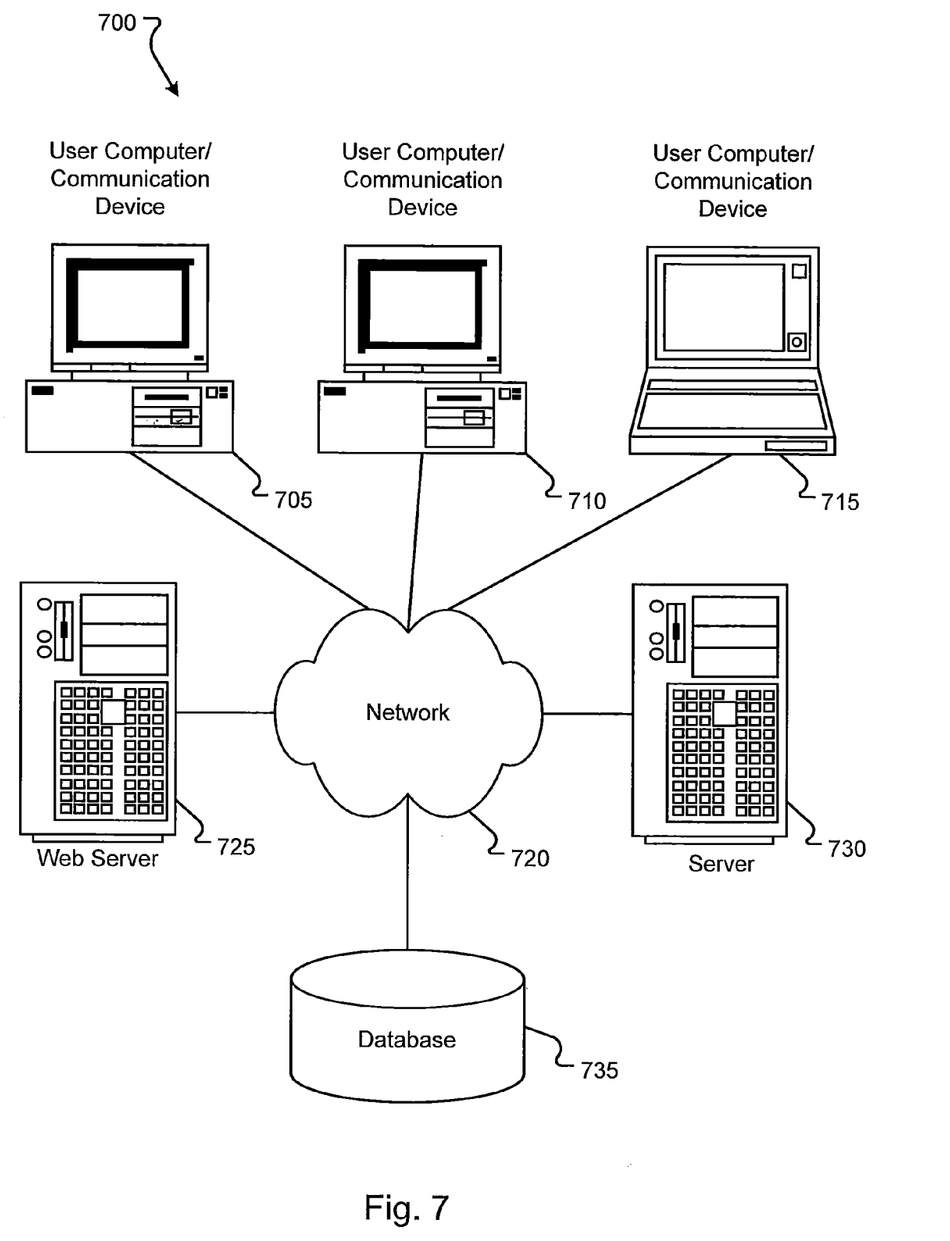
FIG. 7 is a block diagram of an embodiment of a computer system environment in which the systems and methods may be executed.
Figure 8:
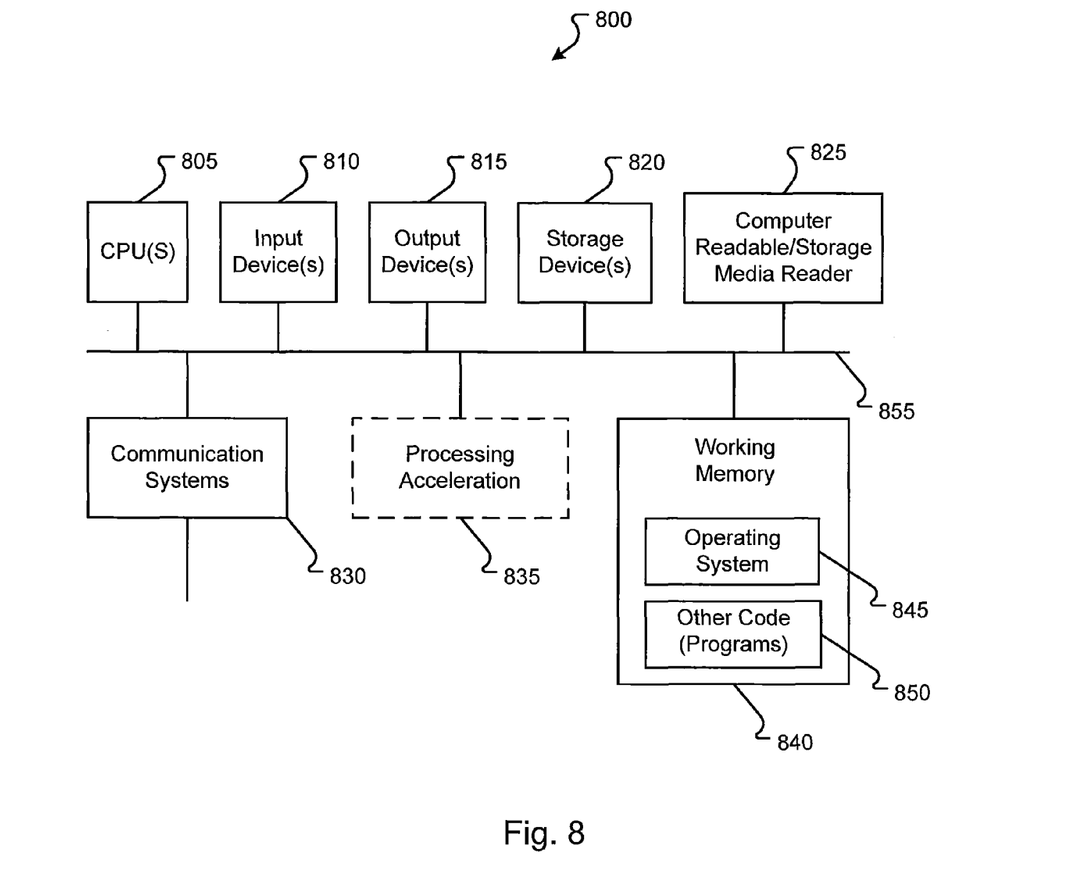
FIG. 8 is a block diagram of a computer system in which the systems and methods may be executed.

The personnel database 312, the HR database 314, and/or communication database 318 can each be a database as discussed in conjunction with FIGS. 7 and 8. The databases 312, 314, and/or 318 may store one or more items of information in one or more data structures. Further, the databases 312, 314, and/or 318 may interface or interact with one or more data interfaces 316. The data interfaces allow each of the other modules (e.g., the rating module 302, agent interface 308, etc.) to store or read data from the databases 312, 314, and/or 318. These data interfaces 316 may provide the data applications, such as Microsoft Access or Oracle Database, that allow for the storage and reading of data from the databases 312, 314, and/or 318.

The personnel database 312 stores information about one or more callers. Generally, the personnel database 312 stores a customer profile described in conjunction with FIG. 4 for each of the callers that are evaluated for employment. The HR database 314 stores information provided to the automated interviewer 304, agent interface 308, and/or manager interface 310 to evaluate the caller in the contact queue(s) 216/217. The communication database 318 can store one or more previous communications with the caller. These previous communications may be used to generate the customer profile stored in the personnel database 312 or used at a later time by the rating module 302 to rate the caller. Further, the rating module 302 may be able to scan or evaluate and analyze previous communications to determine the expertise of a previous caller that may be contacted in the future by an agent or manager to evaluate the person.

Figure 4:
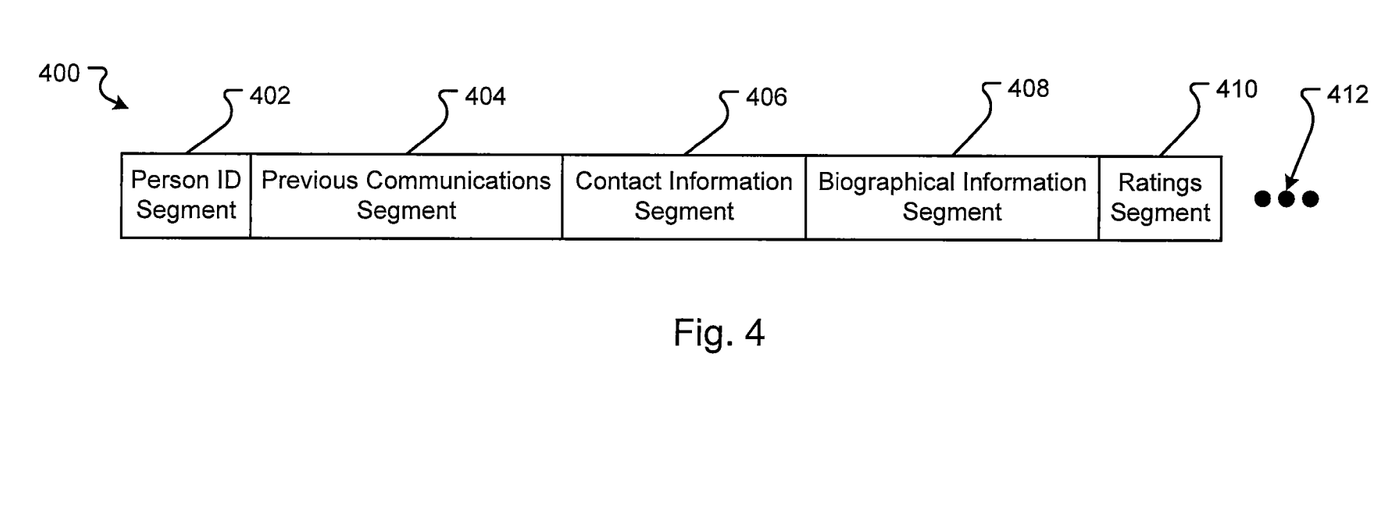
FIG. 4 is a block diagram of an embodiment of a data structure for evaluating a caller for hiring into the contact center.

An embodiment of a data structure 400 that may be received, sent, or stored while determining a rating for a caller is shown in FIG. 4. The one or more data structures described in conjunction with FIG. 4 can be any type of data structure including an object, a field, or other data structure in a relational database, a flat file database, etc. Here, each field within the data structure 400 is described as a segment. However, it should be understood by one skilled in the art, the segment can be a field, attribute, or other data structure according to the type of database used. In embodiments, the data structure 400 includes a person identifier (ID) segment 402, a previous communications segment 404, a contact information segment 406, a biographical information segment 408, and a ratings segment 410. The data structure 400 may have more or fewer fields than those shown in FIG. 4 as represented by ellipses 412.

The person identifier segment 402 can include an identifier for the person that uniquely identifies that person in relation to all other callers to the contact center 100. The person identifier segment 402 can include a person identifier which may be a globally unique identifier (GUID) or some other unique identifier. In other embodiments, the person identifier segment includes the name, address, phone number, email, or other information for the person.

A previous communications segment 404 can store one or more previous communications from the caller holding in the contact queue(s) 216/217. Previous communications segment 404 may store the questions and answers provided to the caller. The information stored in these communications may be evaluated to determine the expertise of the caller. For example, word analysis may be used to determine the level of knowledge of the caller. As such, the communications may be searched for certain terms that would suggest the knowledge of the caller. In other embodiments, the previous communications segment 404 may include a rating or score for the caller for each of the previous communications or as an aggregate of all previous communications. As such, the previous communications may be stored in the communications database 318 and a rating for the caller, based on those communications, may be stored in a previous communications segment 404.

A contact information segment 406 may store contact information for the caller. For example, the contact information may include a phone number, an email address, an address, or other information used to contact the caller. Thus, the contact information segment 406 may store information used to communicate with the caller over the user computer 322 or over the caller's personal communication device after or while the caller holds in queue 216.

The biographical information segment 408 can include biographical information for the caller. The biographical information may be extracted from one or more communications with an agent or manager and stored in the biographical information segment 408. This biographical information may include the location of the caller, the caller's current employment, the caller's hobbies or interests, the caller's education, or other information that may be pertinent to determining whether the caller should be employed. Further, the biographical information segment 408 may also include the resume of the caller or a pointer to the resume that may be stored in the personnel database 312 or the HR database 314. As such, the customer profile 400 can include all the information necessary to evaluate the caller for employment.

A rating segment 410 can include the rating for the caller. The rating may be dynamic and change based on one or more communications that are evaluated by the rating module 302. This rating may also be read by the rating module 302 or one or more other modules to determine how to further evaluate the caller before determining whether the caller should be employed.

Figure 5:
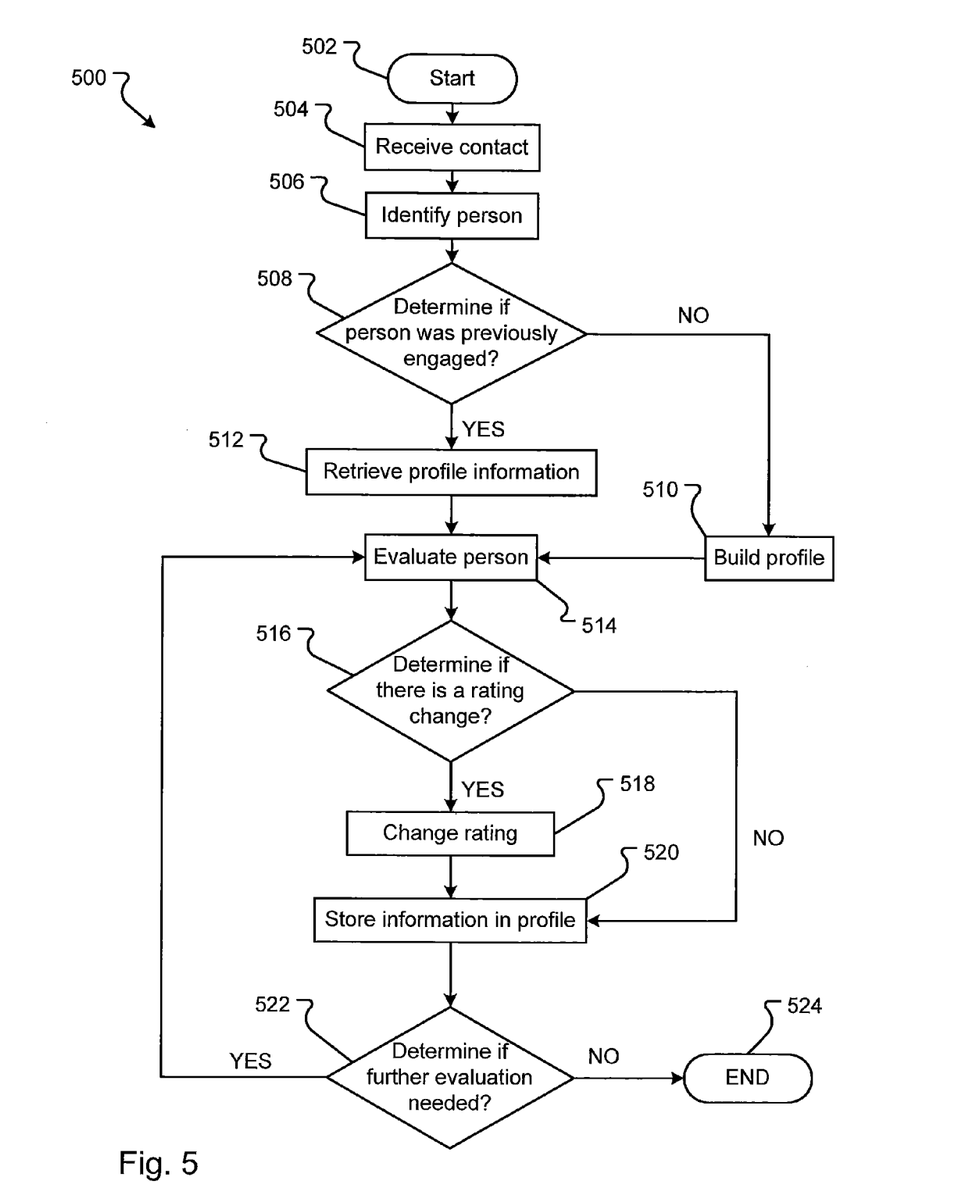
FIG. 5 is a flow diagram of an embodiment of a process for rating a caller and storing a personal profile of the caller that includes the rating.

An embodiment of a process 500 for creating a rating for a caller is shown in FIG. 5. Generally, the method 500 begins with a start operation 502 and terminates with an end operation 524. While a general order for the steps of the method 500 is shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4.

The contact center 100 receives a contact, in step 504. The contact may receive the contact from a telecommunication device 174, which sends the contact through a gateway 178 and packet switch network 162 in the gateway 158. The call is received by the server 110 and may be provided to a first agent that can inquire about the customer's desires or needs, i.e., why the customer called. After this initial inquisition and evaluation, the caller may be placed into the contact queue(s) 216/217 to wait for a skilled agent. The initial agent's evaluation of the customer may be provided to the rating module 302 to begin rating the individual. Further, the information from this first agent may be used to identify the person, in step 506. Identifying the person may include determining the phone number or communication address for the telecommunication device 174 and searching for that information in the contact information segment 406 of the customer profile stored in personnel database 312.

A rating module 302 may then determine if the person was previously engaged in another communication, in step 508. If the rating module 302 finds the communication address of the telecommunication device 174 in the contact information segment 406, then the rating module 302 knows that the person was previously engaged in a communication. In other embodiments, the rating module 302 may search the communications database 318 for information provided by the first agent or for information received from an automated survey that may be associated with a previous communication. If the previous communication is found in the communications database 318, then the rating module 302 knows that the person was previously engaged in a communication. If the person was previously engaged in a communication, step 508 proceeds "YES" to step 512 where the rating module 302 retrieves the customer profile 400 from the personnel database 312. If the person was not previously engaged in a communication, step 508 proceeds "NO" to step 510. In step 510, the rating module 302 builds an initial customer profile 400 in the personnel database 312. Whether the rating module 302 retrieves the customer profile 400 or builds a customer profile 400, the customer profile 400 is then used by the rating module 302 to evaluate and rate the person, in step 514.

The rating module 302 and one or more other components may evaluate the person, in step 514. In one embodiment, an automated interviewer 304 can send an automated survey or interview questionnaire to the user's computer 322, via a web application 320. The user may respond to the interview questionnaire and send the responses back to the web application 320. The automated interviewer 304 may then assess or score the responses received and return the score to the rating module 302. Further, an agent or manager may interface or contact the caller either in the contact queue(s) 216/217 or via the user's computer 322, using either the agent interface 308 or manager interface 310. The agent or manager may ask one or more questions either verbally or via electronic means, such as email or instant message, and return an assessment back to the rating module 302. The rating module 302 may also access or score communications either received from the contact queue(s) 216/217 or stored in the communications database 318. From the information received, the rating module 302 can access a scoring algorithm in the HR database 314 to determine a rating to be stored in the ratings segment 410 of the data structure 400.

The rating module 302 may apply the algorithm received from the HR database 314. The rating module 302 may then determine if the rating has changed (i.e., has increased or decrease due to recent events), in step 516. If the rating has not changed, step 516 proceeds "NO" to step 520. If the rating has changed, step 516 proceeds "YES" to Step 518 where the rating module 302 changes the rating for the caller. The new rating can then be stored in the ratings segment 410 of the customer profile 400, in step 520. After storing the new rating, the rating module 302 may then determine if there is further evaluation required. An embodiment for determining if further evaluation is required may be as described in conjunction with FIG. 6. Generally, the rating module 302 may compare the rating in the ratings segment 410 to one or more thresholds. If the rating is above a certain threshold, further evaluation may be necessary by a different component. For example, if after an agent scores a caller well, the rating module 302 may determine that the caller should complete a questionnaire delivered by the automated interviewer 304. If the rating module 302 does determine that further evaluation is required, step 522 proceeds "YES" back to step 514 to continue evaluation of the person. However, if the rating module 302 decides that further evaluation is not warranted, step 522 proceeds "NO" to end operation 524.

Figure 6:
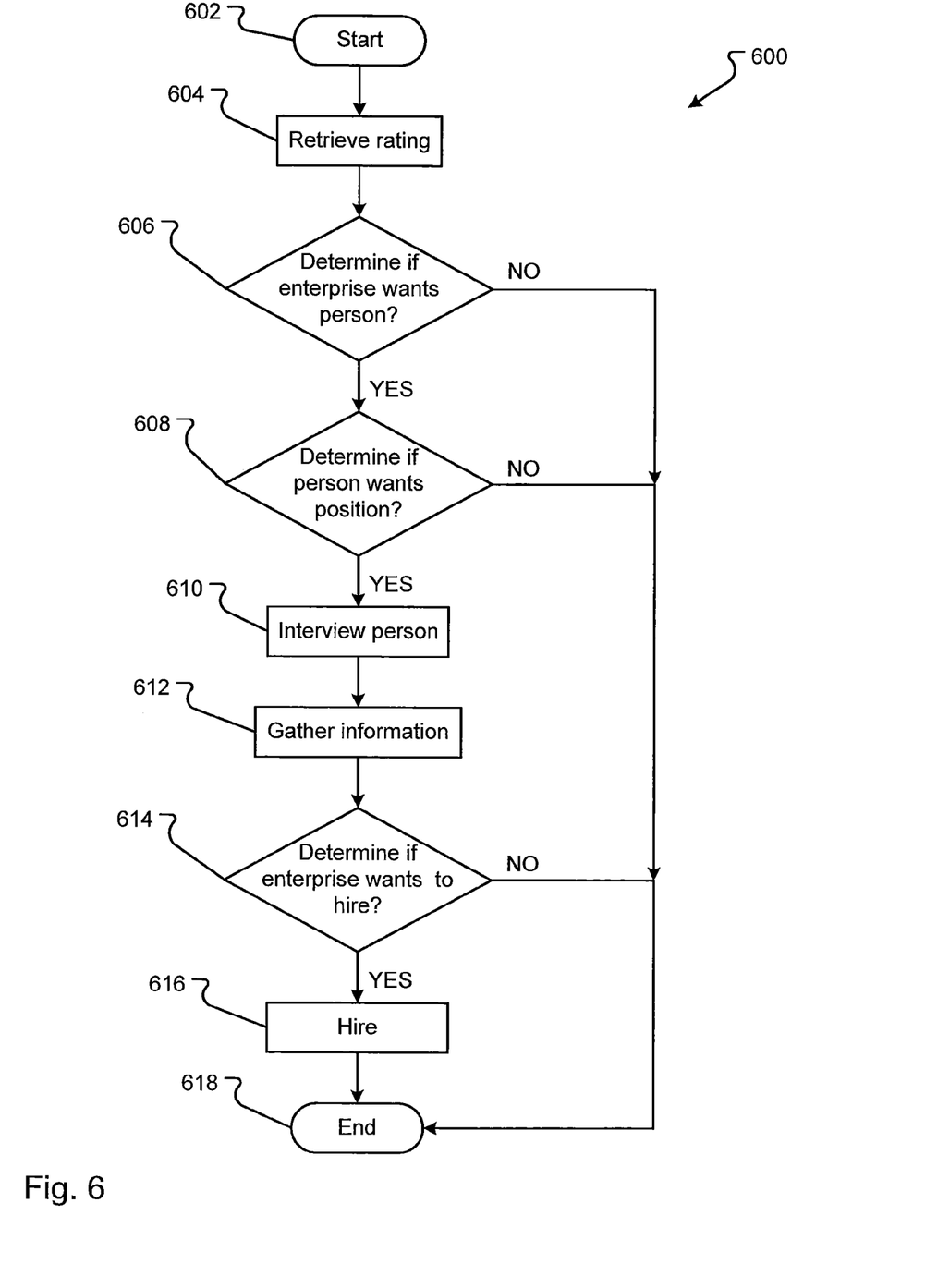
FIG. 6 is a flow diagram of an embodiment of a process for determining whether to hire a caller based on the rating.

An embodiment of a process 600 for determining whether to hire a caller is shown in FIG. 6. Generally, the method 600 begins with a start operation 602 and terminates with an end operation 618. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-4.

The rating module 302 can receive a request to retrieve a rating stored in a rating segment 410 for a potential employee. The request may be sent from an agent interface 308, a manager interface 310, or some other component of the server 110. The rating module 302 may then retrieve the rating from the ratings segment 410 of the caller profile 400 that is stored in the personnel database 312, in step 604. After retrieving the rating, the rating module 302 may send the rating to one or more components. In other embodiments, the rating module 302 can review the rating to determine if the rating is high enough to discuss possible employment with a caller in the contact queue(s) 216/217. Thus, the rating module 302 can evaluate the rating against one or more benchmarks or thresholds. If the rating is higher than a benchmark level, the rating module 302 may automatically determine that the enterprise wants to employ the person, in step 606. If the enterprise wants to employ the person, step 606 proceeds "YES" to step 608. If the enterprise does not want the person, the step 606 proceeds "NO" to the end operation 618.

In step 608, the rating module 302 can determine if the person wanted by the enterprise wants to be employed by the enterprise. In embodiments, the rating module 302 can send a message to the automated interviewer 304, the agent interface 308, or the manager interface 310 to request of the caller in the contact queue(s) 216/217 whether he or she wishes to be employed. The automated interviewer 304 may send an automated request to the caller in the contact queue(s) 216/217 to request whether the person desires to be employed by the contact center 100. If the person does wish to be employed by the contact center 100, the caller may send a response back to the automated interviewer 304, the agent, or the manager, which may send the reply to the rating module 302. If the person does want to be employed, step 608 proceeds "YES" to step 610. If the person does not want to be employed, the process ends with step 608 and proceeds to the end operation 618.

After it is determined that there is mutual interest from the enterprise and the person to employ the caller in the contact queue(s) 216/217, the person may be interviewed in step 610. In one embodiment, the automated interviewer 304 sends an automated interview through a web application 320 to the user computer 322. The automated interview may be a set or series of questions to which the caller can respond and provide information back to the automated interviewer 304. In other embodiments, either an agent or a manager may interview the caller by communicating with them over a telephone while the caller waits in the contact queue(s) 216/217 or via some other media through the user computer 322. The agent or manager may use the agent interface 308 or manager interface 310 to communicate with the person. Two or more of the automated interview 304, agent interface 308, and manager interface 310 may interview the person. Further, the interview may be progressive as the automated interviewer 304 may cull potential candidates before an agent interviews those candidates, and, likewise, the agent may also cull the possible candidates before a manager interviews the candidates.

Through the interview process, information is sent to the rating module 302, which gathers the information, in step 612. The information gathered can be stored in the customer profile 400. This information may include contact information, biographical information, etc. and may help to set a rating as described in conjunction with FIG. 5. The rating module 302 can execute an algorithm from the information to determine a new rating for the caller after each portion of the interview process or after the completion of the interview process. The algorithm may score responses or inputs from the automated interviewer 304, agent interface 308, and manager interface 310. For example, certain responses, such as skill level in certain tasks provided in a response to the automated interview, may have a certain score. Further, the agent or manager may get specific feedback from the interview or may provide a subjective evaluation of the person on some scale, which then may be used to determine the rating of the individual. The rating algorithm may then create a rating score in the rating segment 410.

After gathering the information and creating a rating, the enterprise determines if they want to hire the individual, in step 614. This determination may be automated wherein the rating module 302 determines if the rating is above a hiring benchmark. Thus, if the rating score is greater than the hiring benchmark set by the enterprise, then the person is offered employment. In other embodiments, a manager may determine from the information gathered and the rating whether to hire the individual. If the enterprise does want to hire the individual, step 614 proceeds "YES" to step 616 where a job offer is extended to the caller, which may also be automatically done. If the enterprise does not want to hire the individual, step 614 proceeds "NO" to end operation 618.

Alternative embodiments are possible with the system provided herein. The alternative embodiments may configure the system to interviewing possible candidates for a position with a third party. Thus, another organization may contract with the contact center to interview possible candidates as those candidates call into the contact queue(s) 216/217. Thus, the third party may send a set of criteria, benchmarks, rating algorithm(s), automated interview(s), and other information required by the rating module 302 and other components to effectively interview the candidate. This information may be stored in an HR database in a section dedicated to the third party. As the rating module 302 gathers information and scores the possible candidates, this information may be accessed by the third party such that the evaluation and rating of the candidate is customized according to the third parties' requirements. At some time after determining possible candidates, the rating module 302 can send information back to the third party to allow them to determine who they wish to hire.

It should be known that one or more of the steps or process discussed in the present application may be conducted while the caller is on hold in the contact queue(s) 216/217 or sometime thereinafter. Thus, the gathering of information and rating of the individual does not necessary need to happen all while the person is on hold in the contact queue(s) 216/217. However, at least a portion of the rating process may be completed while the caller is on hold waiting in the contact queue(s) 216/217.

In still further embodiments, the contact center 100 may hire one or more third party agents or experts that can best evaluate the callers for employment potential. These third party agents may use the agent interface 308 to both access the server 110 and communicate with the callers that are waiting in the contact queue(s) 216/217. As such, the contact center 100 can engage callers with human resources specialists that are best able to evaluate callers for potential employment. Further, the callers may also be offered other incentives to help the call center other than full employment. For example, if a caller helps with call while on hold, the caller may receive a shorter wait time or other benefits. Thus, the rating system may determine a caller's potential for various types of work/incentives.

The computers, computer systems, servers, devices, and/or components that are described herein and that may execute the processes described herein may be as described in conjunction with FIGS. 7 and 8. FIG. 7 illustrates a block diagram of a computing environment 700. The system 700 includes one or more computers 705, 710, and 715. The computers 705, 710, and 715 may be general purpose personal computers (including, merely by way of example, personal computers and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 705, 710, 715 may also have any of a variety of applications, including for example, database client and/or server applications, and web browser applications. Alternatively, the computers 705, 710, and 715 may be any other electronic device, such as a thin-client computer, mobile telephone, mobile device, Internet-enabled mobile telephone, and/or personal digital assistant, capable of communicating via a network (e.g., the network 720 described below) and/or displaying and navigating web pages or other types of electronic data. Although the exemplary system 700 is shown with three computers, any number of computers may be supported.

System 700 further includes a network 720. The network 720 may can be any type of network familiar to those skilled in the art that can support data communications using any of a variety of commercially-available protocols, including without limitation TCP/IP, SNA, IPX, AppleTalk, and the like. Merely by way of example, the network 720 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth® protocol known in the art, and/or any other wireless protocol); and/or any combination of these and/or other networks.

The system 700 may also include one or more server computers 725 and 730. The server computers 725 and/or 730 can represent the customer service server 102. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i®, that is adapted to store, update, and retrieve data in response to SQL-formatted commands.

FIG. 8 illustrates one embodiment of a computer system 800 upon which the test system may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815

(e.g., a display device, a printer, etc.). The computer system 800 may also include one or more storage devices 820. By way of example, storage device(s) 820 may be disk drives, optical storage devices, solid-state storage devices, such as a random access memory ("RAM") and/or a read-only memory ("ROM"), which can be programmable, flash-updateable, and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like The computer-readable storage media reader 825 can further be connected to a computer-readable storage medium, together (and, optionally, in combination with storage device (s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 800 may also comprise software elements, shown as being currently located within a working memory 840, including an operating system 845 and/or other code 850, such as program code implementing the components and software described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of computer-readable or machine-executable instructions, which may be used to cause a machine, such as a general-purpose or special-purpose processor or logic circuits programmed with the instructions to perform the methods. These computer-readable or machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of computer-readable or machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for determining a potential of a candidate for employment, the method comprising:
   receiving, by a contact center server, a contact from a person, wherein the contact is a phone call that is not about employment;
   queuing, by the contact center server, the contact in a real-time contact center waiting queue;
   while the person is waiting in the real-time contact center waiting queue, evaluating, by a processor, the person for potential employment;
   determining if the person is to be hired based on the evaluation;
   if the person is to be hired, offering employment to the person while the contact is still enqueued in the real-time contact center waiting queue; and
   if the person is not to be hired, responding by not offering employment to the person while the contact is still enqueued in the real-time contact center waiting queue.

2. The method as defined in claim 1, further comprising:
   in response to the evaluation, a first human agent in a contact center communicating with the person;
   the first human agent in the contact center interviewing the person for employment; and based on the interview for employment, the first human agent in the contact center determining one of two or more real-time contact center waiting queues into which to queue the contact.

3. The method as defined in claim 1, further comprising:
identifying the person;
based on the identity of the person, determining if a profile exists for the person;
if a profile exists for the person, retrieving the profile; and
if a profile does not exist for the person, creating the profile.

4. The method as defined in claim 1, further comprising the contact server automatically determining a rating for the person based on the evaluation and evaluating the person for further employment further comprises evaluating a previous contact from the person by analyzing the contact for specific terms.

5. The method as defined in claim 1, wherein evaluating the person includes at least one of:
providing an automated interview to the person for response;
an human agent interviewing the person; and
a human manager interviewing the person.

6. The method as defined in claim 5, wherein a rating is determined from the automated interview, the human agent interview, and the human manager interview.

7. The method as defined in claim 1, further comprising the steps of:
identifying the person as a candidate to answer another caller's question at a later time when the person is waiting in the real-time contact center call waiting queue; and
providing the person with a code to identify the person as a expert that can potentially answer the other caller's question, wherein the person provides the code while waiting in the real-time contact center call waiting queue at a later time.

8. The method as defined in claim 1, further comprising evaluating a previous communication of the person to determine a rating for the person.

9. A contact center server comprising:
a memory operable to store one or more computer executable instructions;
a processor in communication with the memory, the processor operable to execute the one or more computer executable instructions, wherein executing the one or more computer executable instructions causes the processor to execute components, the components comprising:
a real-time contact center waiting queue operable to:
receive a contact from a person, wherein the contact is a phone call that is not about employment;
an automated interviewer, in communication with the real-time contact center waiting queue, operable to:
interview the person for employment while the person waits in the real-time contact center waiting queue;
a rating module, in communication with the automated interviewer, operable to:
receive, from the automated interviewer, one or more answers, by the person, to the interview for employment;
determine a rating for the person based on the answers;
based on the rating, determine if the person should be offered employment;
when the person should be offered employment, offer employment to the person while the contact waits in the real-time contact center waiting queue; and
when the person should not be offered employment, not offering employment to the person while the contact waits in the real-time contact center waiting queue.

10. The contact center server as defined in claim 9, further comprising a personnel database in communication with the rating module, the personnel database operable to store a profile associated with the person.

11. The contact center server as defined in claim 10, wherein the comprises:
a person identifier segment operable to store one or more items of identifying information to associate the person with the profile;
a contact information segment operable to store one or more items of contact information to communicate with the person;
a biographical information segment operable to store one or more items of biographical information to describe the person; and
a ratings segment operable to store the rating for the person.

12. The contact center server as defined in claim 9, further comprising a communication database in communication with the rating module, wherein the rating module is further operable to retrieve a previous communication with the person from the communication database and, based on information in the previous communication, change the rating for the person.

13. The contact center server as defined in claim 9, further comprising a human resources database in communication with the automated interviewer and the rating module, wherein the automated interviewer is further operable to retrieve the interview for employment from the human resources database and wherein the rating module is further operable to retrieve a rating algorithm from the human resources database to rate the person.

14. The contact center server as defined in claim 9, further comprising:
an agent interface, in communication with the real-time contact center waiting queue and the ratings module, operable to provide communications between an agent and the person as the person waits in the real-time contact center waiting queue, wherein the agent interviews the person for employment and provides an first evaluation to the rating module based on the interview for employment by the agent;
a manager interface, in communication with the real-time contact center waiting queue and the ratings module, operable to provide communications between a manager and the person as the person waits in the real-time contact center waiting queue, wherein the manager interviews the person for employment and provides an second evaluation to the rating module based on the interview for employment by the manager; and
wherein the ratings module is further operable to change the rating based on the first evaluation or the second evaluation.

15. A computer readable medium, stored on a tangible medium, having stored thereon computer-executable instructions when executed by a processor cause the processor to execute a method for determining the hiring potential of a caller to a contact center, the computer-executable instructions comprising:
instructions to receive, by a contact center server, a phone call from a caller, wherein the phone call is not about employment;

instructions to receive information from an first interview of the caller;
instructions to determine a real-time call waiting queue for the phone call from the caller, based on the first interview;
instructions to queue the phone call from the caller;
instructions to determine a rating for the caller, wherein the rating is used to determine if the caller should be considered for employment, based on the first interview;
instructions to provide an automated interview for employment to the caller while the caller waits in the real-time call waiting queue, if the rating is above first threshold;
instructions to receive a response to the automated interview for employment from the caller;
instructions to change the rating, based on the response;
instructions to determine if the person is to be employed, based on the changed rating;
instructions to offer employment to the person while the phone call is still in the real-time call waiting queue, if the person is to be employed; and
instructions to respond to the phone call from the caller by not offering employment while the phone call is still in the real-time call waiting queue, if the person is not to be employed.

16. The computer readable medium as defined in claim 15, further comprising based on the changed rating, executing the instructions to provide the automated interview for employment to the caller while the caller waits in the real-time call waiting queue.

17. The computer readable medium as defined in claim 16, wherein one of a group of an agent, a manager, and a human resource specialist interviews the caller.

18. The computer readable medium as defined in claim 15, wherein a third party provides the automated interview for employment, the third party is provided the rating and information about the caller, and the third party determines if the caller should be employed by the third party.

19. The computer readable medium as defined in claim 18, wherein the offered employment is an incentive for the caller to answer a question from a second caller.

20. The computer readable medium as defined in claim 19, further comprising:

instructions to evaluate a previous communication; and based on the evaluation, instructions to change the rating.

* * * * *

UNITED STATES PATENT AND TRADEMARK OFFICE
CERTIFICATE OF CORRECTION

PATENT NO. : 8,473,423 B2
APPLICATION NO. : 12/797507
DATED : June 25, 2013
INVENTOR(S) : Anjur S. Krishnakumar et al.

It is certified that error appears in the above-identified patent and that said Letters Patent is hereby corrected as shown below:

In the Claims:

Column 17, Line 21, please delete "an human" and insert --a human-- therein.

Column 17, Line 32, please delete "as a" and insert --as an-- therein.

Column 18, Line 10, please delete "wherein the comprises:" and insert --wherein the personnel database comprises:-- therein.

Column 18, Line 44, please delete "an first" and insert --a first-- therein.

Column 18, Line 52, please delete "an second" and insert --a second-- therein.

Column 19, Line 1, please delete "an first" and insert --a first-- therein.

Column 19, Line 12, please delete "above first threshold" and insert --above a first threshold-- therein.

Signed and Sealed this
Eighteenth Day of February, 2014

Michelle K. Lee
*Deputy Director of the United States Patent and Trademark Office*